(12) United States Patent
Wilkie et al.

(10) Patent No.: US 7,047,823 B2
(45) Date of Patent: May 23, 2006

(54) APPARATUS FOR MOUNTING ELECTRONIC MODULE ASSEMBLY IN SENSOR

(75) Inventors: Brian J. Wilkie, Little Compton, RI (US); Timothy M. McBride, Sharon, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/875,018

(22) Filed: Jun. 23, 2004

(65) Prior Publication Data

US 2005/0284238 A1 Dec. 29, 2005

(51) Int. Cl.
*G01L 1/22* (2006.01)
(52) U.S. Cl. .......................... 73/862.045; 73/862.044; 73/862.06
(58) Field of Classification Search ........... 73/862.045, 73/862.044, 862.06
See application file for complete search history.

(56) References Cited

U.S. PATENT DOCUMENTS

| 6,453,747 | B1 | 9/2002 | Weise et al. | |
| 6,646,446 | B1 | 11/2003 | Maher et al. | |
| 6,742,395 | B1 * | 6/2004 | Borgers et al. | 73/717 |

* cited by examiner

*Primary Examiner*—Edward Lefkowitz
*Assistant Examiner*—Linda P. Field
(74) *Attorney, Agent, or Firm*—Russell E. Baumann; Frederick J. Telecky, Jr.

(57) ABSTRACT

An occupant weight sensor (1) for placement between a frame (7) fixed to the chassis of a vehicle and a second frame (8) supporting a vehicle seat has a sense element having a first body (12, 22, 28, 34, 50, 62, 64, 68, 84) formed with a planar sense surface on which are mounted piezoresistors electrically connected in a Wheatstone bridge configuration. A post (12a, 22c, 28c, 34e, 50b, 62a, 64a, 68b, 84g) extends outwardly from the first body for attachment to the first frame. A second body is formed with a force transfer portion (14a, 24g, 30d, 36b, 52a, 70a, 94a) permanently attached to the first body along an outer periphery circumscribing the sense surface. The piezoresistors are electrically connected to conditioning electronics received in a chamber formed between the two bodies. The effects of parasitic loads on the sense element are minimized by selected placement of the piezoresistors on the sense surface. In one embodiment, attachment stresses of an electronic module assembly (88) are isolated from the sense surface by attaching the assembly to a support ring end wall (86*a*) welded to a portion of the first body removed from the sense surface and providing a control gap between the support ring and the sense surface. Several variations are disclosed for attaching the sensor to the first and second frames and both longitudinally and laterally extending electrical connectors are shown.

15 Claims, 11 Drawing Sheets

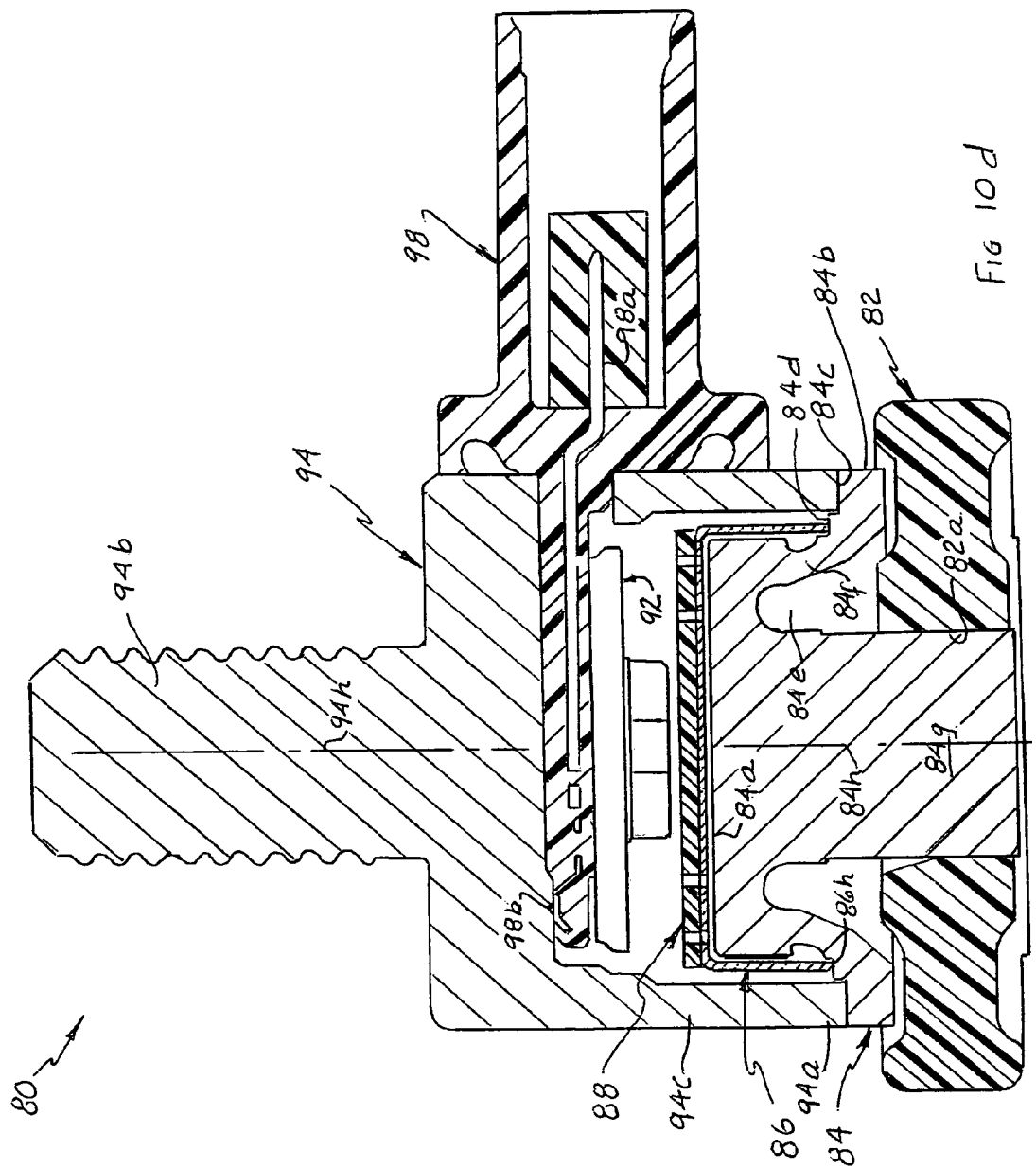

APPARATUS FOR MOUNTING ELECTRONIC MODULE ASSEMBLY IN SENSOR

CROSS REFERENCE TO RELATED APPLICATIONS

U.S. application Ser. Nos. 10/874,963 and 10/875,039 filed Jun. 23, 2004 and Jun. 23, 2004 respectively, and both assigned to the assignee of the present invention contain subject matter related to the subject matter of this application.

FIELD OF THE INVENTION

This invention relates generally to condition responsive sensors and more particularly to weight sensors used for weighing occupants of a vehicular seat in order to prevent or modify airbag deployment for improved safety of the seat occupant.

BACKGROUND OF THE INVENTION

Governmental legislation requires the development of a system capable of sensing information related to front passenger seat occupants and classifying such occupants to the extent necessary to adapt airbag deployment to improve passenger safety. For example, airbag deployment can be a problem for small children or children in car seats occupying a front passenger seat. Using information provided by vehicular seat weight sensors, a control system can override the normal airbag actuation mechanism and prevent airbag deployment when such a child occupies a seat having appropriate weight sensors. In other situations, airbag deployment can remain active but its intensity can be modulated in response to sensed weight information, for example, when the occupant is incorrectly positioned or is within some intermediate weight classification.

SUMMARY OF THE INVENTION

An object of the present invention is the provision of weight sensor apparatus having sense elements with high sensitivity, good stability, good environmental resistance, strong overstress capability and good rejection of parasitic loads.

Another object of the invention is the provision of a vehicular seat occupant weight sensor apparatus for measuring an occupant's weight by sensing the force transmitted to the vehicle floor from the seat.

Yet another object of the invention is the provision of a seat weight sensor having an output signal that is proportional to seat weight, that is accurate from −40 degrees C. to 115 degrees C., that has minimal vertical height and that is stable over time and during overload exposures (for example, as a result of accidents).

Still another object of the invention is the provision of such a sensor which will not compromise the mechanical integrity of existing seat assembly architectures during overload exposures (e.g., accidents) as well as the provision of packaging and means of attachment which permit easy incorporation into the vehicle assembly during a high volume production.

Another object of the invention is the provision of apparatus for mounting an electronic module assembly in a sensor in close, rigid proximity with a stress sensitive sense surface without introducing any unnecessary stresses to the surface, particularly those which can vary over time.

Briefly, an occupant weight sensor for a vehicular seat made in accordance with the invention is adapted for interposition between a first frame fixedly attached to the chassis of a vehicle and the seat, for example, a second frame which supports the seat and comprises a sense element having a first body with a generally flat surface having an outer periphery and with piezoresistors attached to the surface and electrically connected in a full Wheatstone configuration. A post extends outwardly from the first body along a first longitudinal axis for attachment to the first frame. A second body is formed with a force transfer portion permanently attached to the first body along the outer periphery thereof and has a mounting portion for attachment to the second frame.

Conditioning electronics and a connector are provided for conditioning the bridge output signal and providing electrical power and output.

Although various configurations can be employed for the flat sense surface, a generally circular surface is preferred. According to a feature of the invention, the piezoresistors are disposed on the sense surface at selected locations to minimize affects of parasitic loads. In one preferred embodiment having a circular sense surface, the full bridge comprises first and second half bridges wherein the first half bridge has a first piezoresistor disposed adjacent to the outer periphery of the first body at one end of a common diameter and a second piezoresistor disposed adjacent to the center of the circular sense surface and the second half bridge has a third piezoresistor disposed adjacent to the center of the sense surface and a fourth piezoresistor disposed adjacent to the outer periphery of the sense surface at the opposite end of the common diameter.

In another preferred embodiment having a circular sense surface, the full bridge comprises first and second half bridges wherein the first half bridge has a first piezoresistor aligned radially adjacent to the outer periphery of the sense element along a common diameter on one side of the center of the circular surface and a second piezoresistor aligned tangentially disposed closely adjacent to the first piezoresistor, and the second half bridge has third and fourth piezoresistors similarly disposed on the sense surface diametrically opposed to the first and second piezoresistors.

According to a feature of the invention, the piezoresistors are composed of monocrystalline silicon which are glass bonded to the sense surface to provide strong signal to noise ratios and high levels of mechanical safety factor. If desired, the piezoresistors of one or more half bridges may be formed on the same piece of silicon.

According to a preferred embodiment of the invention, the sense element comprises a first generally cylindrical body having a first longitudinal axis and a portion formed with a circular flat sense surface lying in a plane generally perpendicular to the first longitudinal axis. The body has an outer periphery circumscribing the sense surface. A plurality of strain gauges are disposed on the sense surface and a post extends outwardly from the body along the first longitudinal axis. A second body is attached to the outer periphery of the first body and has a second longitudinal axis generally coincident with the first longitudinal axis when the two bodies are attached to one another and a second post extends outwardly from the second body along the second longitudinal axis. An annular axial load applying surface is formed on the second body circumscribing the second post and an annular load reacting surface is formed on and circumscribes the first post and a circumferential groove is formed in the outer surface of the first body forming a web extending between the outer periphery of the first body and the first post to mitigate the affects of parasitic loads applied to the sensor. According to a feature of one embodiment, the web is formed with a selected length which is greater than the width of the web.

According to a preferred embodiment of the invention, a metallic cup-shaped support ring having an end wall and a side wall depending therefrom is rigidly attached to the first body by laser welding the distal free end of the support ring side wall to a seat on the first body removed from the sense surface but with the end wall extending over the planar sense surface. A control gap is provided between the end wall and the sense surface and between the side wall and the first body except for the distal free end. An electronic module assembly is suitably attached mechanically and electrically to the opposite face surface of the end wall of the support ring by suitable means such as electrically conductive epoxy or laser welding to a ground trace of a printed circuit board of the electronic module assembly.

BRIEF DESCRIPTION OF THE DRAWINGS

Other objects, advantages and details of the occupant weight sensor for vehicular seats and system therefore of the invention appear in the following detailed description referring to the drawings in which:

FIG. 6 is a perspective view of an occupant weight sensor made in accordance with a fourth embodiment of the invention, also shown in FIG. 1a.

FIG. 10d is an elevational cross section of the FIG. 10 sensor as assembled but, for purposes of illustration, shown without the electronic components and contact springs of FIG. 10.

DETAILED DESCRIPTION OF PREFERRED EMBODIMENTS

Occupant weight sensors made in accordance with the invention employ monocrystalline silicon strain gauge technology to convert mechanical inputs from the system, i.e., the weight of the occupant of the seat into electrical signals. Such technology used for various automotive pressure sensing applications is known, as shown and described in U.S. Pat. No. 6,453,747, assigned to the assignee of the present invention, the subject matter of which is incorporated herein by this reference.

Mechanical input to the sensor produces stress in the silicon piezoresistors which have the property in which their resistance undergoes a relative change in proportion to the applied stress. The piezoresistor effect in monocrystalline silicon is extremely strong with an equivalent gauge factor of approximately 150. This feature enables strong signal to noise ratios compared to other strain gauge technologies such as bonded metal foil or thick film ink with gauge factors in the range of approximately 3–20. Having a strong signal to noise ratio is important in vehicular occupant weight sensing applications where overstress requirements are severe. Having such a high gauge factor, results in operating stresses 7–50 times smaller than in competitive technologies for a fixed signal size thereby enhancing the mechanical safety factor.

The piezoresistors are electrically connected to form a full Wheatstone bridge. The bridge provides a differential output voltage which is proportional to the applied mechanical input, i.e., occupant weight. This signal is calibrated and compensated with a bridge conditioning ASIC to ultimately provide the system with a signal proportional to the externally applied weight. The ASIC provides full conditioning of the sensor output over the entire operating range of force and temperature. While it is preferred that the output is supplyratiometric analog, other output formats could be used if desired, such as PWM (pulse width modulation) or low level bus. In addition to providing a force signal, an option could be included to provide a temperature signal to the system. For example, a temperature signal could be provided on a continuous basis on an extra connector pin or it could be time multiplexed into the force signal pin. The conditioning electronics can also be provided with self-diagnosis for informing the control system when certain malfunctions are present in the sensor output or in the electrical connection between the sensor and the system as taught in copending application Ser. No. 09/952,257, Publication No. US-2002-0033700-A1, assigned to the assignee of the present invention, the subject matter of which is incorporated herein by this reference.

Figure 1:
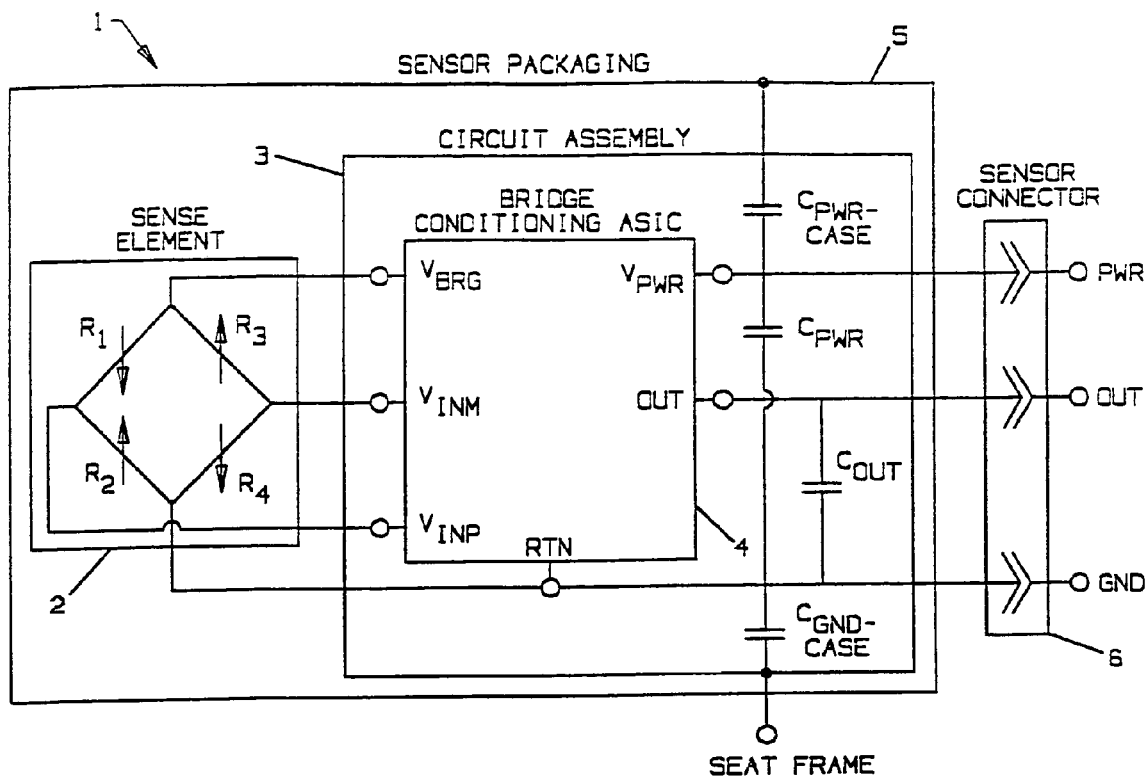
FIG. 1 is a schematic diagram of an occupant weight sensor made in accordance with the invention.

With reference to FIG. 1, occupant weight sensor 1, made in accordance with the invention includes a sense element 2, an electronic module or circuit assembly 3, a bridge conditioning ASIC 4, a sensor package 5 and a connector 6. Sense element 2 comprises piezoresistors R1, R2, R3 and R4 electrically connected to form a full Wheatstone bridge and with piezoresistors R1, R4 decreasing in resistance and piezoresistors R2 and R3 increasing in resistance with increasing load. The bridge is electrically connected to bridge conditioning ASIC 4 with bridge voltage pin $V_{BRG}$ of ASIC 4 connected to the junction of piezoresistors R1, R3, input pins $V_{INM}$ and $V_{INP}$ of ASIC 4 connected to the junction of piezoresistors R3, R4 and R2, R1, respectively. The junction of piezoresistors R2, R4 is connected to pin RTN of ASIC 4 and to ground GND of connector 6. The ASIC has a power pin $V_{pwr}$ and an output pin OUT connected to power PWR and output OUT, respectively, of connector 6. Circuit assembly 3 also includes several suitable filter capacitors.

Figure 1A:
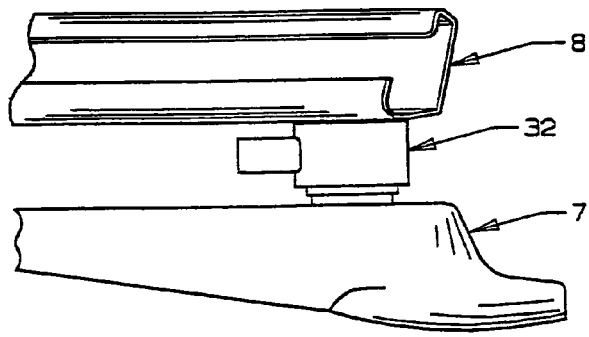
FIG. 1a is a front elevational view showing a first, broken away, frame for fixed attachment to a vehicle chassis and a second, broken away, seat support frame with an occupant weight sensor made in accordance with one of the preferred embodiments of the invention interposed between the frames.

FIG. 1a shows one possible position of an occupant weight sensor when mounted for use in a vehicle. An occupant weight sensor 32 is shown made according to one of the preferred embodiments to be described below interposed between a first, broken away, frame 7 for fixed attachment to the chassis of a vehicle and a second, broken away, seat support frame 8. It will be understood that the sensor could also be mounted in other locations, such as above seat tracks, i.e., between an upper track and a pan frame.

Figure 2:
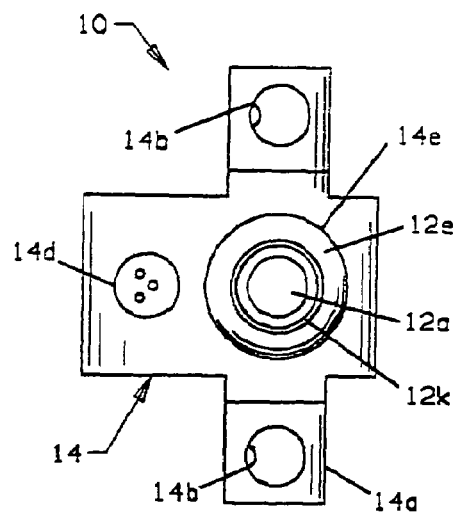
FIG. 2 is a top plan view of an occupant weight sensor made according to a first preferred embodiment of the invention.
Figure 2A:
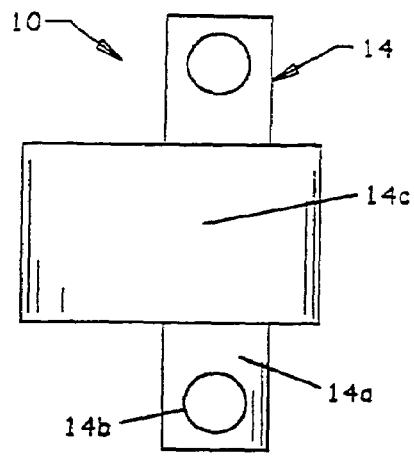
FIG. 2a is a bottom plan view thereof.
Figure 3:
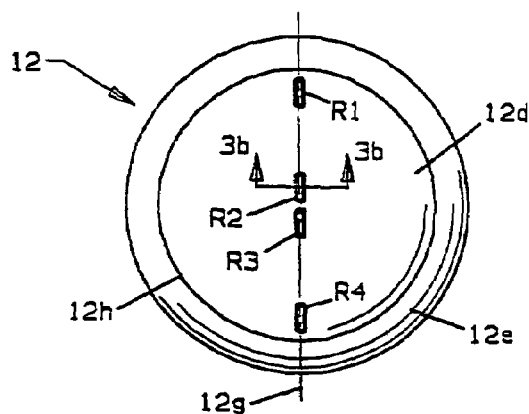
FIG. 3 is a top plan view of a sense element showing one preferred sense element array used in the FIG. 2 sensor.

FIGS. 2 and 3 show an occupant weight sensor 10 made according to a first preferred embodiment which incorporates functional components of FIG. 1. Sensor 10 comprises a sense element, best seen in FIGS. 3, 3a, formed of a unitary body 12 of suitable material, such as stainless steel, having a high yield point, good corrosion resistance and being compatible with the strain gauge attachment process, to be described. The body is formed with suitable means at one end to mechanically fasten the sense element to a suitable structure.

Although other fastening means could be employed, a threaded post 12a having a longitudinal axis 12b is shown. Preferably, a longitudinally extending orientation flat 12c is formed along the threaded post. On the other end of the body, a generally planar sense surface 12d is disposed essentially normal to longitudinal axis 12b. Although various configurations can be used, preferably sense surface 12d is circular in shape. The body also has a radial flange 12e extending outwardly beyond the sense surface forming an outer periphery to serve as a mechanical interface with a second body to be described.

Strain gauges comprising piezoresistors R1–R4 are fabricated from single crystal silicon and, as noted supra, provide a gauge factor of approximately 150. A glass bonding process, known in the industry, is used to permanently attach the gauges to sense surface 12d by means of glass 12f, as best seen in FIG. 3b, providing high sensitivity, good stability, good environmental resistance and strong overstress stability.

Ideally, an occupant weight sensor measures only the axial load applied to the sensor in a manner to be described below so that the weight of the occupant can be inferred. However, due to numerous effects, dimensional variation between components, variable system compliance and the like, forces are applied to the sense element outside of a "pure" axial force. These loads, frequently termed parasitic loads, shift the sensor offset and compromise the determination of the occupant weight.

A significant form of parasitic loads takes the form of moments about the sense element body. It has been found that gauge placement is important and that failure to place gauges in optimum location results in undesirable gauge performance. Improperly placed gauges result in reduced axial span as well as moment sensitivity.

The strain gauges are located so that, when the piezoresistors are electrically connected to form a full Wheatstone bridge as shown in FIG. 1, rejection of parasitic side-loads is enhanced. In the instant embodiment, piezoresistors are all disposed along a common diameter 12g of the circular sense surface with piezoresistors R1 and R4 closely adjacent to the outer periphery 12h on opposite sides of center and with piezoresistors R2, R3 closely adjacent to the center on opposite sides thereof.

Figure 2B:
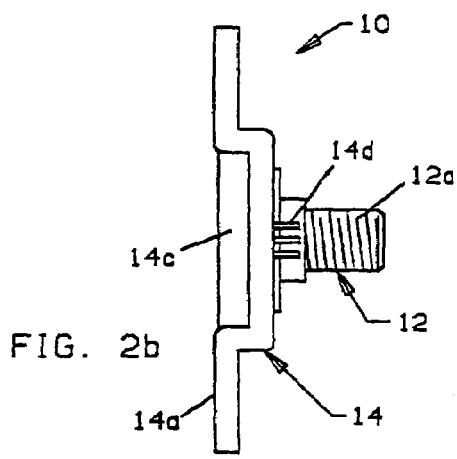
FIG. 2b is a left side elevational view thereof and FIG. 2c is a rear elevational view thereof.
Figure 2C:
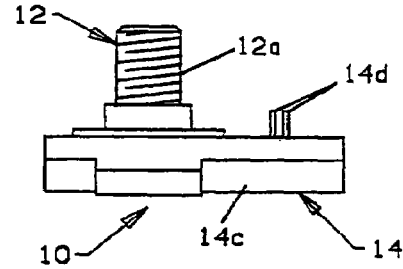

Sense element body 12 may be provided with a hub portion 12k on threaded post 12a providing a surface 12m as a load reacting surface. An annular groove 12n, shown in FIG. 3a but not shown in FIGS. 2b, 2c, may be formed between hub 12k and radial flange 12e to tailor the strain field in the area of the gauges.

A second body 14, formed of suitable material, such as stainless steel, which is provided with a centrally disposed opening 14e to receive sense element body 12 with radial flange 12e permanently attached to second body 14 as by laser welding about the outer periphery of the flange. Second body 14 comprises an elongated plate like element 14a having first and second ends with a mounting hole 14b disposed adjacent each end for attachment to suitable structure so that the sensor is interposed between support structure for the vehicle seat and the chassis of the vehicle. The portion of element 14a welded to radial flange 12e serves as a force transfer portion for the sense element 12.

Second body 14 also mounts a circuit board (not shown) to which the strain gauges are wire bonded. The board includes electronics for compensating the sense element output to achieve accurate output across a full temperature range. The electronics are sealed from the environment by an environmental cover 14c and a mating environmental seal (not shown). An electrical connector 14d provides a means for externally powering the sensor and receiving the sensor output.

Figure 3A:
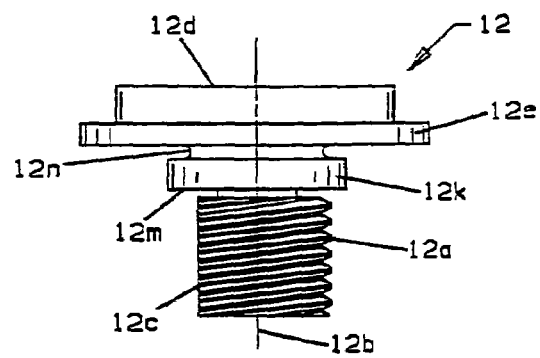
FIG. 3a is an elevational view thereof and FIG. 3b is a cross sectional view taken on line 3b—3b of FIG. 3.
Figure 3B:
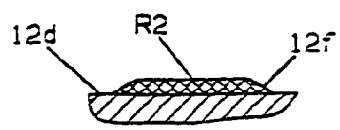
Figure 4:
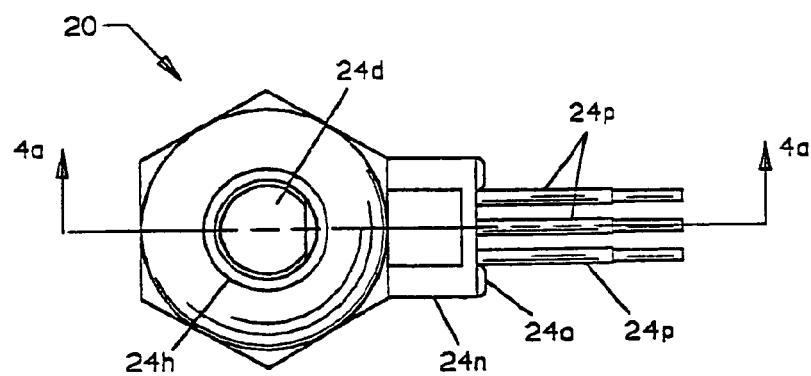
FIG. 4 is a top plan view of an occupant weight sensor made in accordance with a second preferred embodiment of the invention.
Figure 4A:
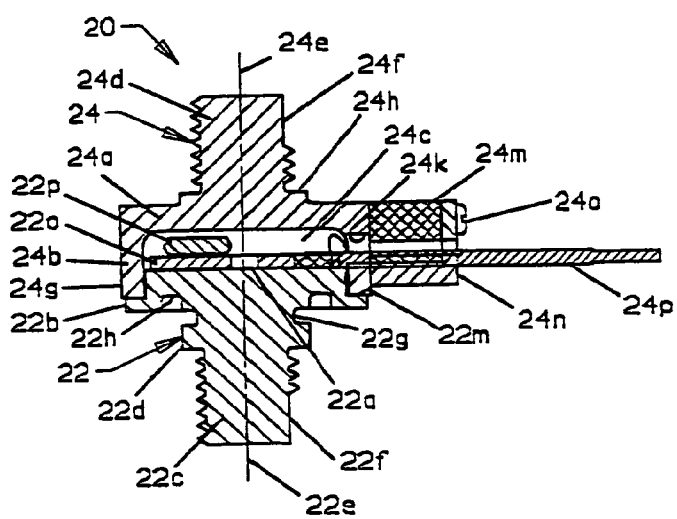
FIG. 4a is a cross sectional view taken on line 4a—4a of FIG. 4
Figure 4B:
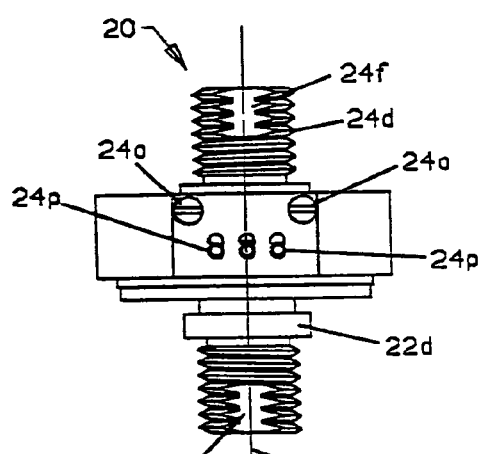
FIG. 4b is a right side elevational view of the FIG. 4 sensor.
Figure 5:
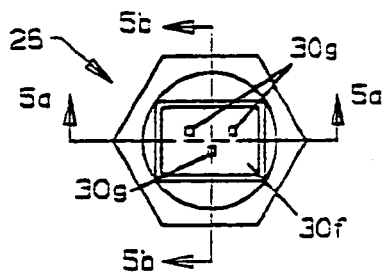
FIG. 5 is a top plan view of an occupant weight sensor made according to a third preferred embodiment of the invention.
Figure 5A:
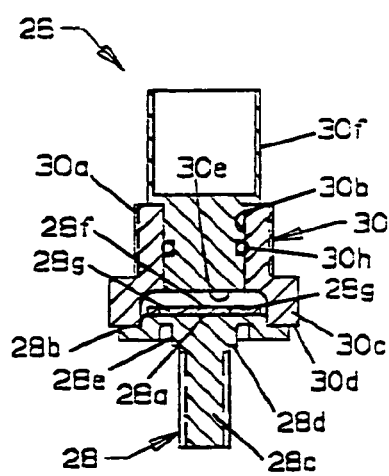
FIG. 5a is a cross sectional view taken on line 5a—5a of FIG. 5, 5b is a cross sectional view taken on line 5b—5b of FIG. 5
Figure 5B:
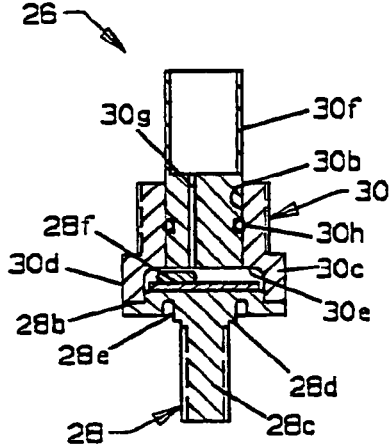
FIG. 5c is a perspective view of the FIG. 5 sensor.
Figure 5C:
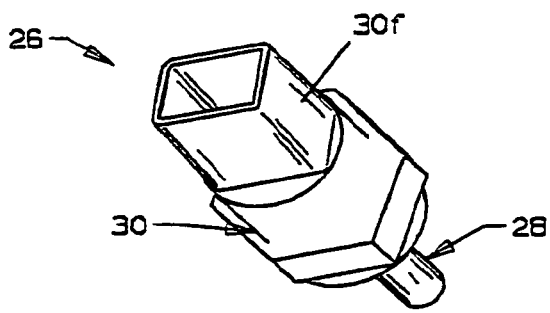

With reference to FIGS. 4, 4a and 4b, a second preferred embodiment of the invention shows an occupant weight sensor 20 comprising a sense element having a first body 22 similar to body 12 shown in FIGS. 3, 3a and formed with a generally planar circular sense surface 22a and having an outer periphery 22b thereabout in the form of an outwardly radially extending flange forming a stepped seating surface 22m axially spaced from the sense surface. Threaded post 22c extends in a first direction away from hub 22d of body 22 along a longitudinal axis 22e and preferably includes an orientation flat 22f. Longitudinal axis 22e is essentially normal to planar sense surface 20a and passes through the center of the circular sense surface. An annular groove 22g, comparable to groove 12n of FIG. 3a, is formed between body 22 of the sense element and threaded post 22c. Additionally, an annular groove 22h is formed in the exterior surface of body 22 between the post and the stepped seating surface 22m to tailor the strain field in the area of the gauges by flattening the strain field in that area. This will be described in greater detail below in connection with FIG. 8a.

A second body 24 comprises an end wall 24a formed with a tubular sidewall 24b to form a recess 24c. A second threaded post 24d extends away from end wall 24a along a longitudinal axis 24e. Threaded post 24d preferably is provided with an orientation flat 24f similar to flat 22f of the first body. The outer distal portion 24g of tubular wall 24b is received on stepped seat 22m, preferably spaced slightly from sense surface 22a and is permanently attached thereto around the periphery, as by welding. Preferably, an annular load application surface 24h is formed on second body 24 about post 24d. Loads applied to post 24d and surface 24h are transferred to the sense element through the outer distal portion 24g which serves as a force transfer portion. When bodies 22, 24 are attached to one another, the longitudinal axes 22e, 24e are essentially coincident passing through the center of the circular sense surface 22a.

Second body 24 is formed with an opening 24k in sidewall 24b to provide access for laterally extending connector 24m formed of suitable electrically insulative material attached to second body 24 along with strain relief cap 24n by suitable fasteners 24o. Wire leads 24p extend through the connector and strain relief cap and are connected to electronics (not shown) on circuit board 22o received in recess 24c. An output conditioning ASIC 22p is mounted on the circuit board and suitable piezoresistors are wire bonded to the circuit board, electrically connected to form a Wheatstone bridge.

FIGS. 5, 5a–5c show a third preferred embodiment of an occupant weight sensor made in accordance with the invention. Sensor 26 comprises a sense element similar to the sense elements of the previous embodiments with a circular planar sense surface 28a on which is mounted suitable piezoresistors electrically connected in the form of a Wheatstone bridge, a radially outwardly extending flange preferably longitudinally offset from the sense surface forming a seat 28b for receipt of the tubular force transfer portion of a second body to be discussed. A threaded post 28c extends outwardly from body 28 along the longitudinal axis which is essentially normal to the circular sense surface and which passes through the center thereof. A hub portion of the fixed end of the post forms an annular force transfer portion 28d and an annular groove 28e is formed in the exterior surface of body 28 intermediate to the post and seat 28b.

Second body 30 is formed with an externally threaded portion 30a formed with a longitudinally extending opening 30b through the body. Portion 30a is joined to tubular sidewall 30c having a distal end portion 30d, which serves as the force transfer portion, received on seat 28b of the first body member and permanently attached thereto as by welding. Sidewall 30c is preferably formed with an external polygonal, e.g., hexagonal, configuration to facilitate handling and mounting and internally defines an electronics receiving recess 30e. The external transition between wall portions 30a and 30c form an annular force application surface for applying a load to the sense element through annular seat 28b.

An electrical connector 30f formed of suitable electrically insulative material is received in opening 30b and mounts axially extending wire leads (not shown but received in holes 30g extending longitudinally through the connector). An environmental seal 30h is disposed between the connector and the wall of portion 30a defining opening 30b. A circuit board 28f with a signal conditioning ASIC is received in recess 30e and, as in the previous embodiments described above, electrical connections are made between piezoresistors mounted on sense surface 28a (not shown) exposed through openings 28g formed in the circuit board.

A fourth preferred embodiment of an occupant weight sensor is shown in FIGS. 6 and 6a–6g as well as FIG. 1a. Sensor 32 of this embodiment comprises a sense element having a first body 34 composed of suitable material such as stainless steel, see FIGS. 6b, 6c in particular, having a circular, planar sense surface 34a and having an outer periphery 34b preferably longitudinally offset from the sense surface to form an annular seat 34c. A second intermediate annular flange 34d is formed between seat 34c and sense surface 34a to facilitate assembly of other components to be discussed. A threaded post 34e extends away from body 34a along longitudinal axis 34f. A suitable orientation flat 34g may be formed on threaded post 34e or, as shown, on the outer periphery 34b. Post 34e is formed with a hub portion having a portion 34k of increasing diameter with increasing distance from body 34 and having a lower radially inwardly extending surface 34m which serves as a force reacting surface. An annular groove 34n is formed in the exterior surface of the body intermediate to the post and annular seat 34c. This groove serves to flatten the strain field on sense surface 34a in the region of piezoresistor placement near the outer periphery of the sense surface.

Single crystalline silicon piezoresistors or gauges are glass bonded to the sense surface as described above and electrically connected to form a full Wheatstone bridge and are disposed so that for each half bridge, one gauge increases resistance with increasing load and the other gauge decreases resistance with increasing load. In the instant embodiment, one gauge is aligned radially near the perimeter of the sense surface and the second gauge is aligned tangentially closely to the first gauge. As alluded to above, piezoresistors placed close to one another can comprise either individual pieces of silicon or they can be formed on the same silicon crystal. When a load couple is applied to the sense surface having such a half bridge, the output varies strongly with the angular orientation of the couple. By placing a second half bridge diametrically opposed to the first in a like orientation, the differential output of a full bridge is less sensitive to an applied couple. Further improvement can be obtained by tailoring the configuration of the sense element to flatten the strain field in the area of the gauges, as will be discussed further, below.

Figure 6:
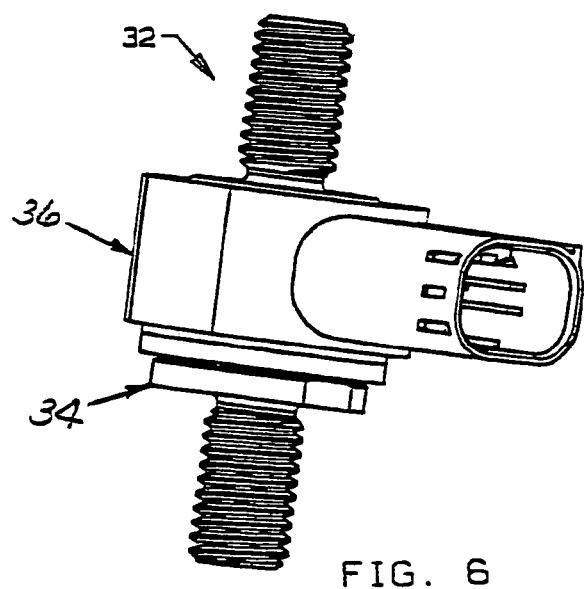
Figure 6A:
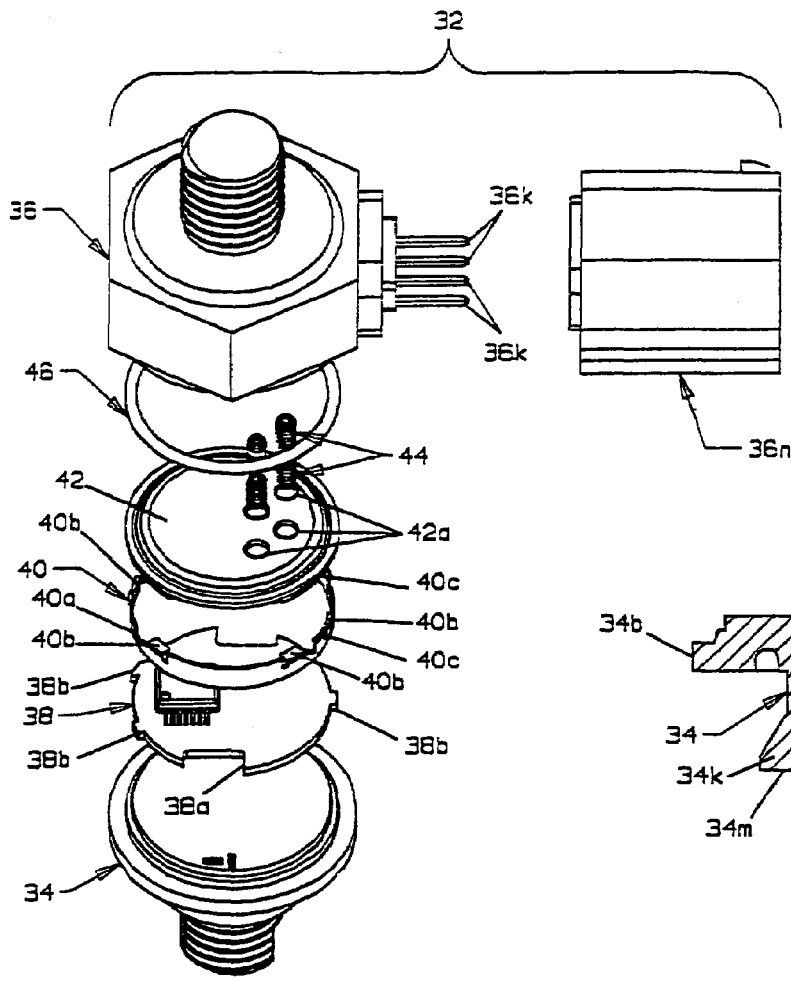
FIG. 6a is a blown apart perspective view of the FIG. 6 sensor.

As shown in FIG. 6a, in addition to sense element body 34, sensor 32 includes a second body 36, a circuit board 38, a weld ring 40, a contact holder 42, contact springs 44, and an environmental seal 46.

Circuit board 38 is disposed on sense surface 34a with cut-out portions 38a aligned with the piezoresistors bonded to the sense surface. A plurality of radially outwardly extending tabs 38b are received in slots 40a of weld ring 40, see FIG. 6d. The weld ring is slidingly received on annular flange 34d with folded over retainer tabs 40b engaging the top surface of circuit board 38. A generally disc shaped contact spring holder 42 having a plurality of through holes 42a respectively mount therein suitable contact coil springs 44. Weld ring 40 is formed with upwardly extending flanges 40c having a retention feature for receipt in complimentary retention features on the perimeter of the contact holder. Environmental seal 46 in the form of an O-ring is received on top of spring holder 42 with contact springs 44 engaging selected conductive pads on the circuit board on one end with the other end extending above the surface of the contact holder.

Figure 6B:
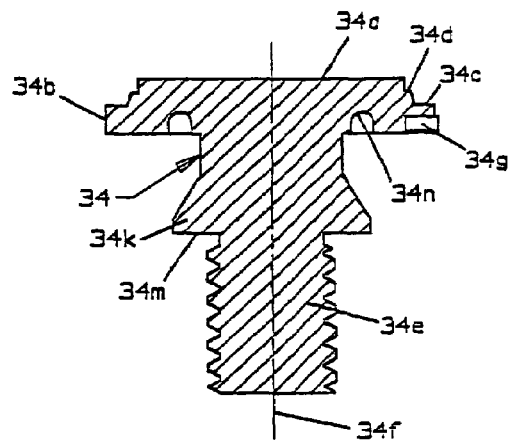
FIGS. 6b and 6c are respectively an elevational cross section and a perspective view of the sense element body of FIG. 6 showing a preferred arrangement of piezoresistor gauges mounted on a planar sense surface.
Figure 6C:
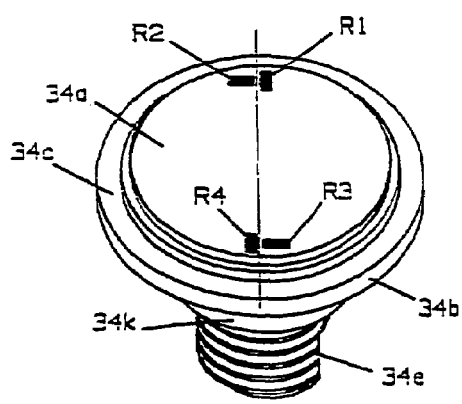
Figure 6D:
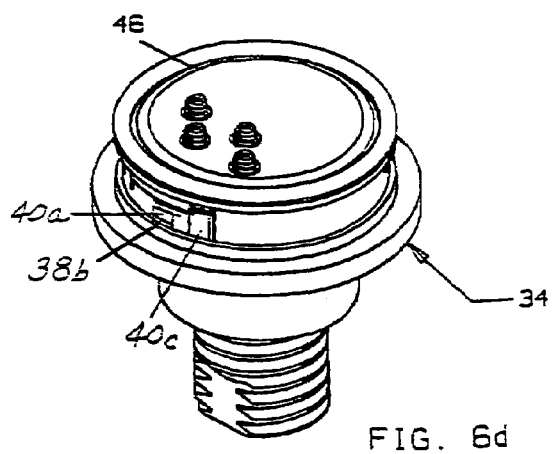
FIG. 6d is a perspective view similar to FIG. 6c but showing the sensor partially assembled.
Figure 6E:
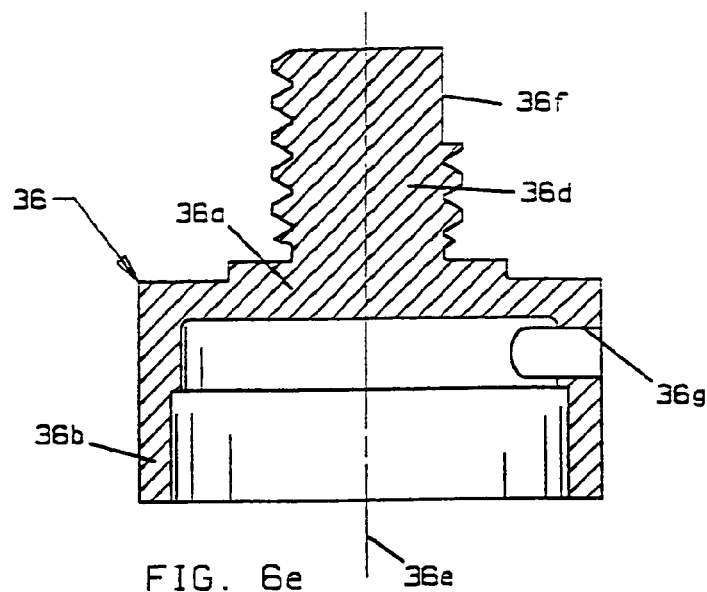
FIG. 6e is a cross sectional elevational view of a second body, also shown in FIG. 6a, for receipt on the sense element body.
Figure 6F:
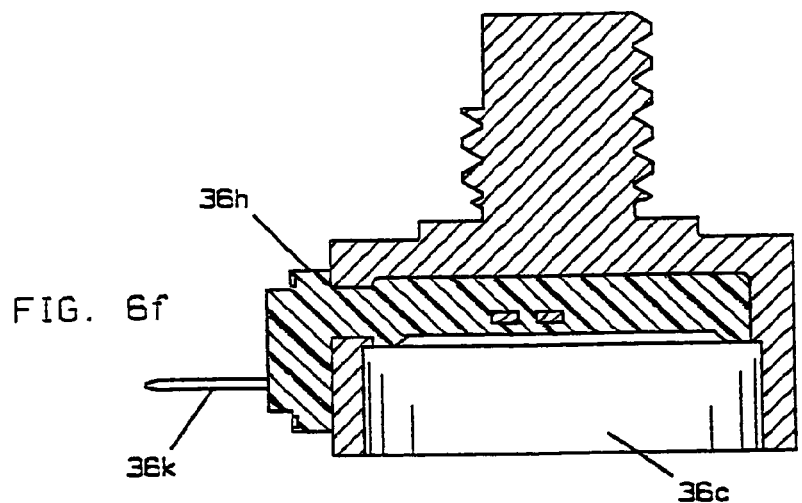
FIG. 6f is a cross sectional elevational view similar to FIG. 6e but in reverse orientation and shown with an insert molded connector assembly mounted thereon.
Figure 6G:
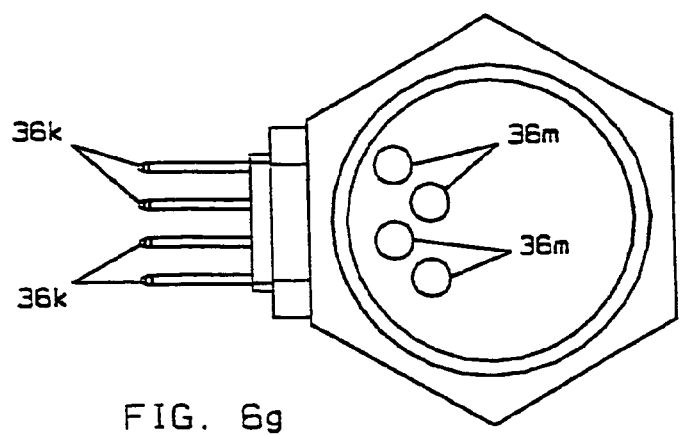
FIG. 6g is a bottom plan view of the FIG. 6f body using a slightly smaller scale than that of FIG. 6f.

Second body 36, see FIGS. 6e, 6f, is formed of suitable material such as stainless steel and has an end wall 36a and a tubular sidewall 36b defining a recess 36c. A threaded post 36d, which may be provided with an orientation flat 36f, extends outwardly from the body along a longitudinal axis 36e. An opening 36g is formed in sidewall 36b to allow placement of an insert molded connector/terminal assembly 36h, as seen in FIG. 6f, received through the opening and seated in recess 36c. Assembly 36h includes a plurality of terminals 36k, the terminals each having a conductive pad 36m exposed through a cut away portion of the connector/terminal assembly, as shown in FIG. 6g. Second body 36 is received on first body 34 with the free end portion (force transfer portion) of tubular wall 36b received on seat 34c and attached thereto around the periphery as by laser welding. When the bodies are attached to one another, the longitudinal axes 34f and 36e essentially coincide and contact springs 44 engage conductive pads 36m of the connector/terminal assembly. After the bodies are welded together, an electrically insulative shroud 36n is received over terminals 36k and is attached to the connector, terminal assembly as by being ultrasonically welded thereto.

FIGS. 7, 7a–7c show modifications of the FIG. 6 sensor. Sensor 48 comprises a sense element having a first body 50 composed of suitable material, such as stainless steel, having a circular, planar sense surface, as in the FIG. 6 embodiment, and having an outer periphery 50a forming an annular seat for receiving the force transfer portion or distal free end 52a of the tubular sidewall of second body 52. As in the FIG. 6 sensor, a threaded post 52b extends away from second body 52 along a longitudinal axis which is coincident with longitudinal axis 50c of body 50 passing through the center of the sense surface once the bodies are joined together as by laser welding around the outer periphery as indicated at 53. A post 50b also extends away from body 50 along longitudinal axis 50c and is fixedly attached preferably to a central portion of an elongated bracket 54, as by welding thereto. Bracket 54 is formed with a mounting hole 54a adjacent to each opposite end of the elongated bracket for attachment to the first frame connected to the chassis of a vehicle. First body 50 is formed with an annular recess 50d in the outer surface of the body between post 50b and the outer periphery 50a, to be discussed below in relation to FIGS. 8, 8a.

Instead of weld ring 40 of the FIG. 6 sensor, a snap ring 56 having a locking feature in the form of an inwardly extending protrusion 56a formed on the inside surface thereof is received on first body 50 with the ring circumscribing the sense surface. Protrusion 56a is received in a recess 50e formed in a cylindrical sidewall portion of first body 50 defining the sense surface. Ring 56 may be formed with an orientation feature, such as longitudinally extending rib 56b received in a matching groove formed in the cylindrical wall portion. Ring 56 is generally cylindrical and, when seated on first body 50, extends above the sense surface and provides a mounting seat for contact spring holder 58 as well as forming a housing for silicone gel placed around the wire bonds connected to the ASIC. A suitable connector assembly 60 mounts pin terminals 60a which provides electrical connection to circuit board 50f through contact springs 44 as in the FIG. 6 sensor.

Figure 7:
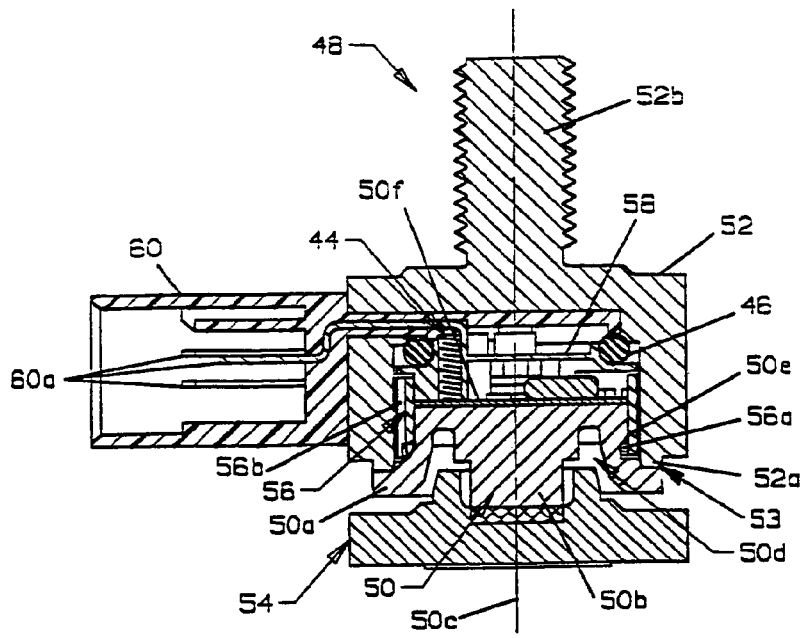
FIG. 7 is a cross sectional, elevational view of a modification of the FIG. 6 sensor taken on line 7—7 of FIG. 7a, FIG. 7a is an elevational view of the FIG. 7 modified structure.
Figure 7A:
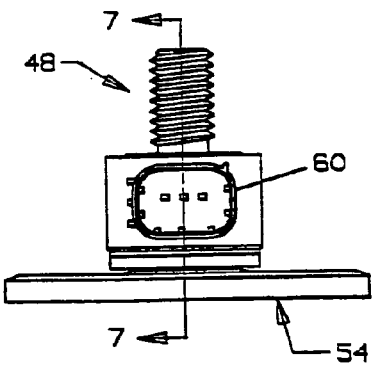
FIGS. 7b, 7c are top and bottom plan views, respectively, of the FIG. 7a sensor.
Figure 7B:
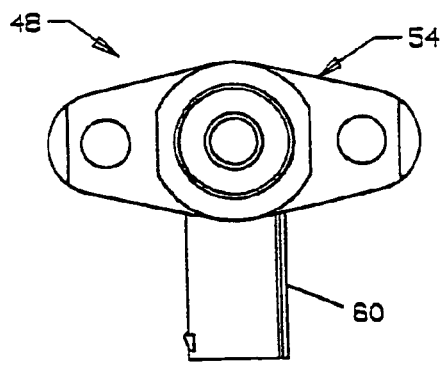
Figure 8:
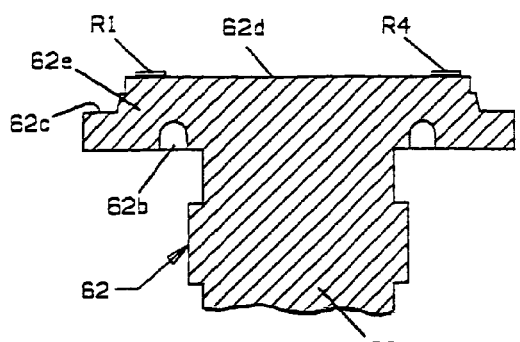
FIG. 8 is an elevational, broken away, cross sectional view of one preferred embodiment of a sense element.
Figure 8A:
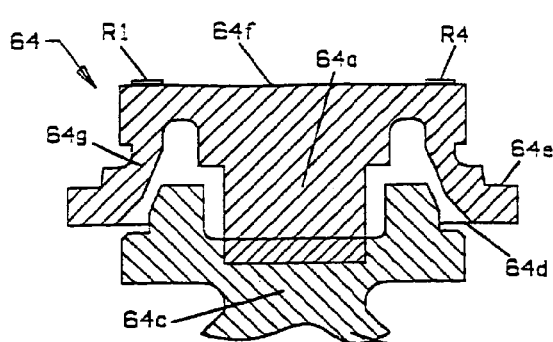
FIG. 8a is a similar view of a modified preferred embodiment of a sense element.

FIG. 8 shows a sense element 62, with its post 62a broken away, similar to those described in the preceding preferred embodiments, particularly the embodiment shown in FIG. 6b, while sense element 64 in FIG. 8a shows a sense element similar to that of sensor 48 of FIG. 7 but having a threaded post 64a rather than bracket 54. Post 64a is broken away for purposes of illustration. With respect to FIG. 8, annular groove 62b is formed in body 62 through the exterior surface between post 62a and annular seat 62c for seating the force transfer portion of a second body (not shown) received on and attached to the outer periphery of the body 62 for applying occupant load to the sensor. Groove 62b in effect forms an annular web 62e having a selected width between the groove and seat 62c and a selected length depending on the depth of the groove. The formation of this web serves to flatten the strain field on the outer circumferential portion of sense surface 62d.

Sense element 64 of FIG. 8a comprises first and second body portions 64a, 64c of suitable metallic material, such as stainless steel, welded together to form a unitary sense element formed with an annular recess or groove 64d, generally U-shaped in cross section at each side of the cross sectional view. The groove effectively is formed between the post and annular seat 64e and defines a web 64g between annular seat 64e and sense surface 64f which has a selected length greater than the selected width of the web. The ratio of a selected web length greater than the selected web width provides an enhanced flattening effect of the strain field in the outer peripheral portion of sense surface 64f.

Figure 9:
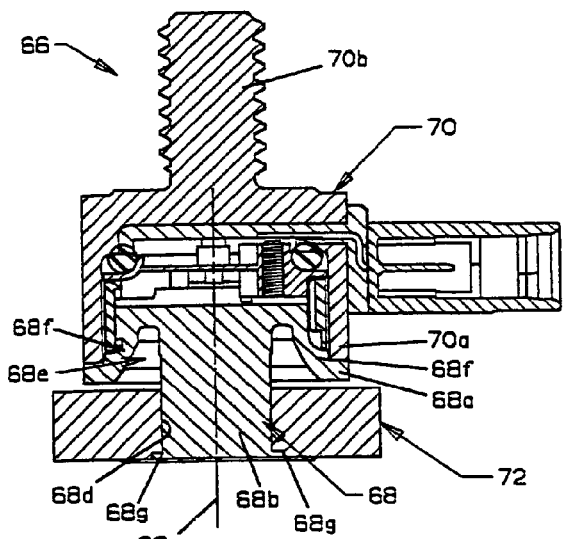
FIGS. 9 and 9a are cross sectional elevational views of slightly different scales of a modification of the FIG. 7 sensor.
Figure 9A:
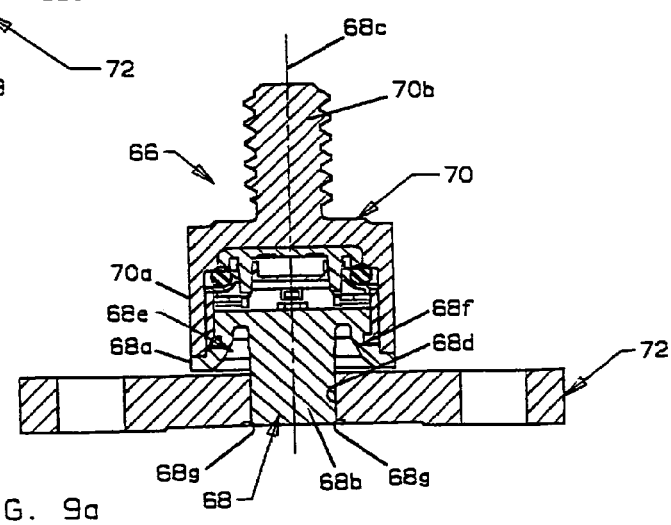

FIGS. 9 and 9a show a sensor similar to the FIG. 7 sensor but having a modified sense element. Sensor 66 comprises a sense element having a first body 68 composed of suitable material, such as stainless steel, having a circular planar sense surface as in the FIG. 7 embodiment, and having an outer periphery 68a forming an annular seat for receiving the force transfer portion or distal free end 70a of the tubular sidewall of second body 70. As in the FIG. 7 sensor, a threaded post 70b extends away from second body 70 along a longitudinal axis which is coincident with longitudinal axis 68c of body 68 passing through the center of the sense surface once the bodies are joined together as by laser welding around the outer periphery.

A post 68b also extends away from body 68 along longitudinal axis 68c and extends through a bore 68d formed through a bracket 72 and is fixedly attached to the bracket as by welding thereto at 68g on the lower side of the bracket. Any suitable welding procedure may be used such as $CO_2$ laser welding. In the FIG. 7 embodiment, axial loading results in the weld between post 50b and bracket 54 being placed in tension. As the bracket bends in high load conditions, since the bracket is held through mounting holes 54a, the spin weld is put in bending. High stresses are at the edge of the weld which can cause the weld to unzip. In the FIGS. 9, 9a embodiment, a more robust sense element is provided by inserting the post in bore 68d of bracket 72. Upon axial loading, weld 68g is placed in shear, even during bending of the bracket, with the load distributed across the full weld area.

As in the FIG. 7 embodiment, an annular recess 68e is formed in the outside surface of first body 68 between post 68b and the outer periphery 68a forming web 68f having a selected length greater than the selected width of the web. The description of the FIG. 7 embodiment can be referred to for details of the remaining structure.

With reference to FIGS. 10 and 10a–10d, a modification of the FIG. 7 sensor is shown having a feature which greatly reduces packaging stresses on the sense surface of the sense element. As shown in the exploded view of FIG. 10, sensor 80 comprises a mounting bracket or flange 82, a sense element or first body 84, a support ring 86, an electronic module 88, contact springs 90, a contact spring holder 92, a second body 94, an environmental seal 96 and a connector/shroud 98 which dove-tails into an opening in the tubular side wall of second body 94.

As in the FIG. 7 sensor, first body 84 composed of suitable material such as stainless steel, has a generally circular, planar sense surface 84a and an outer periphery 84b, preferably offset longitudinally from the sense surface, to form a radially extending annular seat 84c for receiving the force transfer portion or distal end 94a of the tubular side wall of second body 94.

A second intermediate radially extending annular seat 84d is formed between annular seat 84c and the sense surface 84a for receiving support ring 86, to be discussed. First body 84 is also preferably formed with an annular recess 84e in the outside surface between a post 84g extending away from first body 84 along longitudinal axis 84h and the outer periphery 84b forming web 84f having a selected length greater than the selected width of the web, as in the FIG. 7 sensor.

Figure 7C:
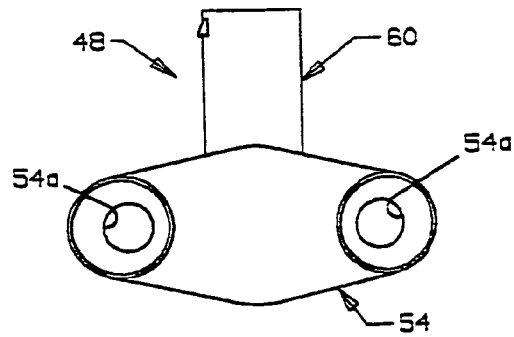

Post 84g is received in bore 82a of an elongated bracket 82 having a mounting hole at two opposite ends (not shown but similar to mounting holes 54a of bracket 54 in FIG. 7c) for attachment to seat structure. Post 84g is fixedly attached to bracket 82, preferably by laser welding.

Figures 10, 10A:
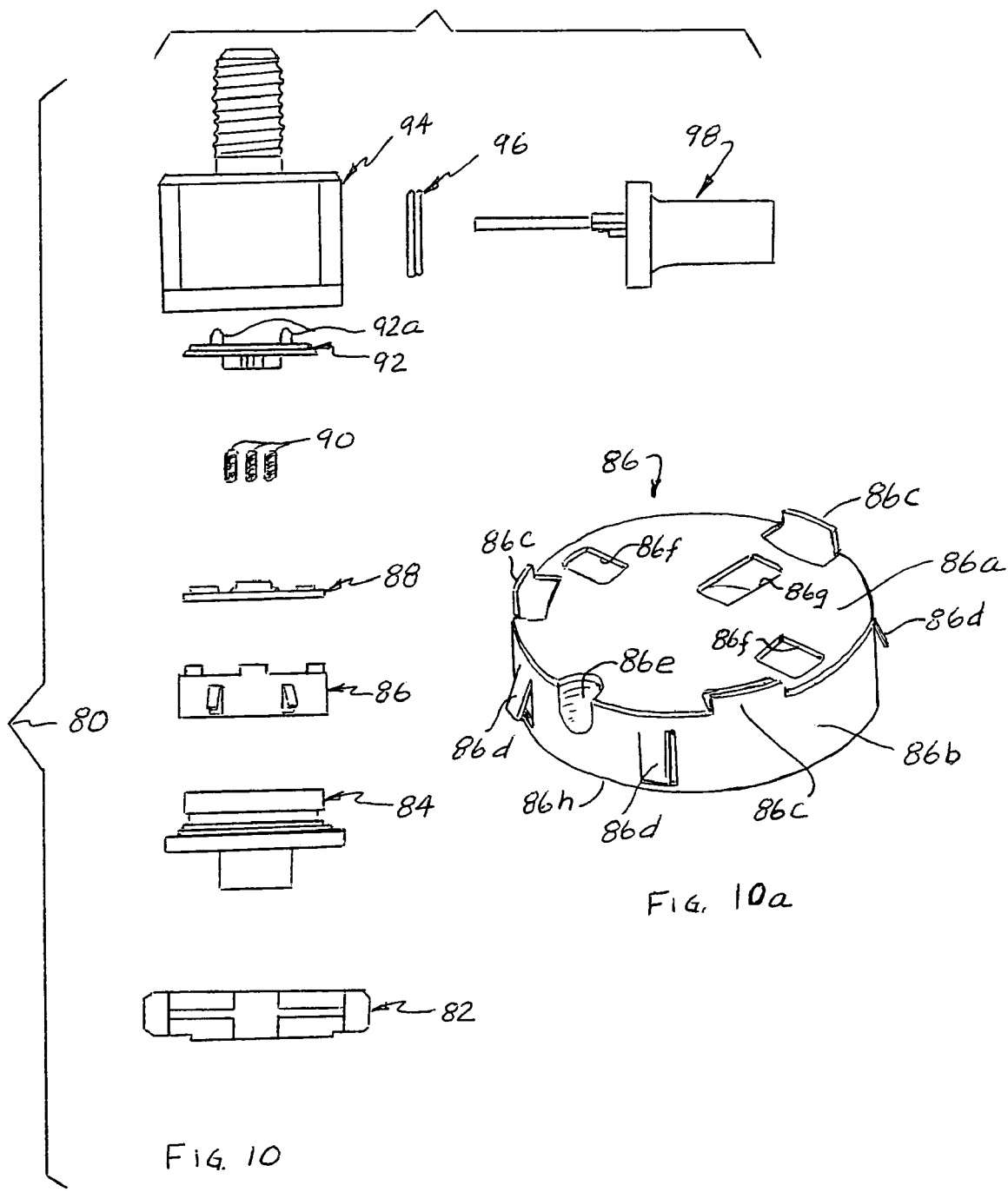
FIG. 10 is an exploded front elevational view of an occupant weight sensor made in accordance with another preferred embodiment of the invention.
FIG. 10a is an enlarged perspective view of a support ring shown in FIG. 10.
Figure 10B:
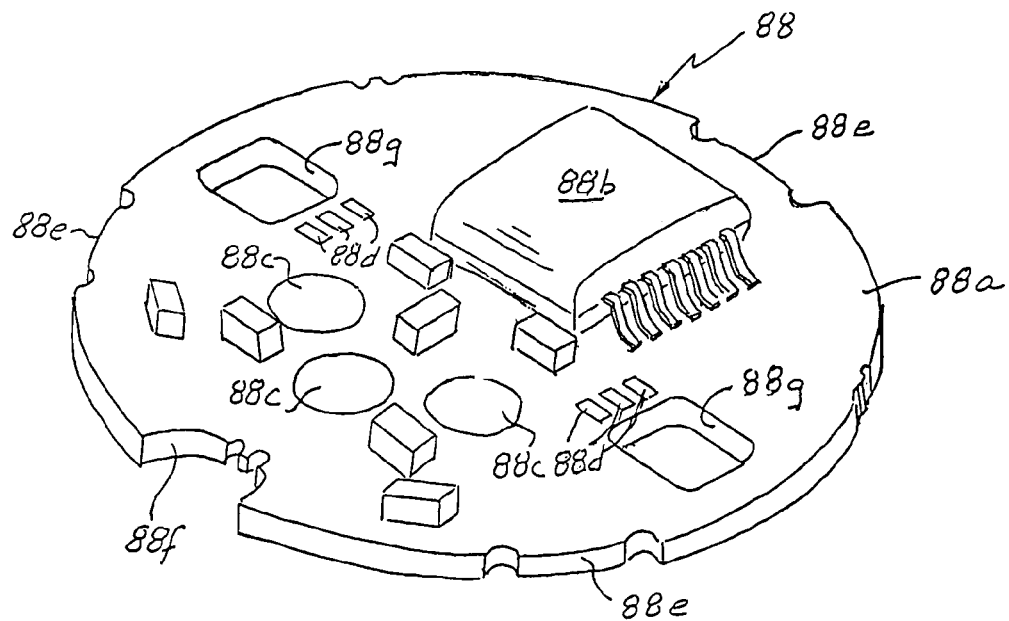
FIG. 10b is a further enlarged perspective view of an electronic module assembly shown in FIG. 10.
Figure 10C:
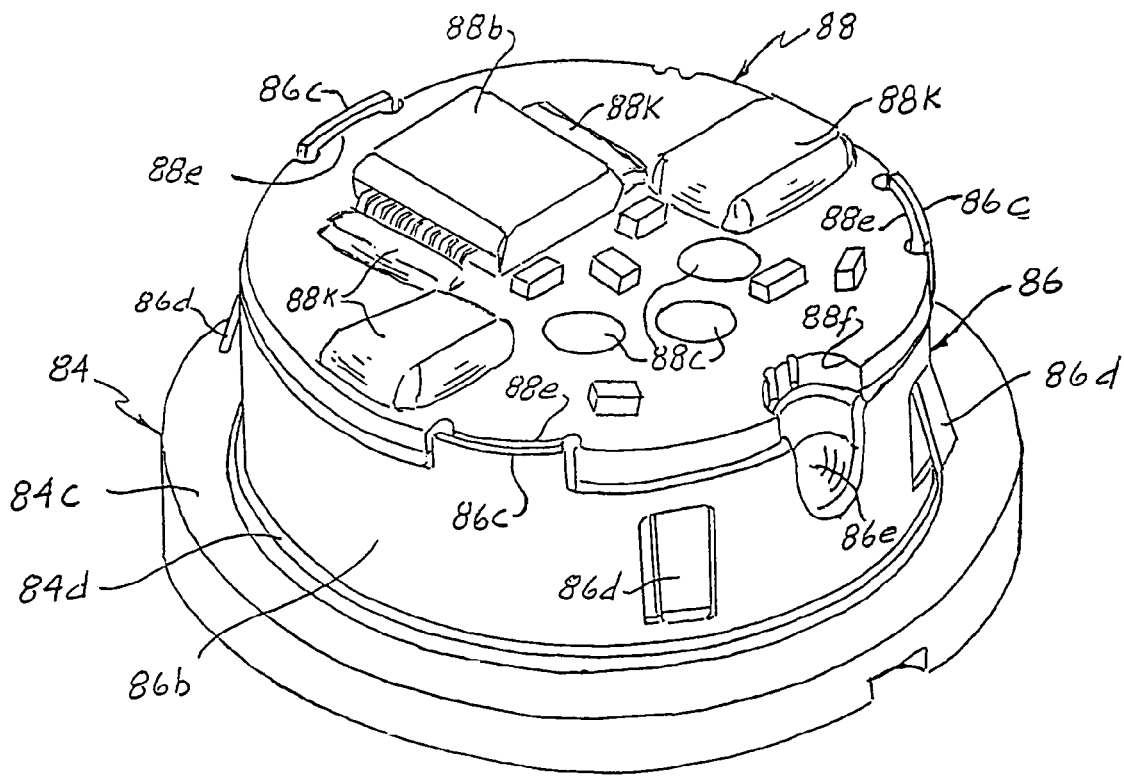
FIG. 10c is a perspective view in a different scale of the support ring of FIG. 10a and electronic module assembly of FIG. 10b mounted on a first body shown in FIG. 10.

Support ring 86, see in particular FIG. 10a, is a formed of suitable material, such as stainless steel and is generally cup-shaped having a circular end wall 86a and a depending side wall 86b. Three bend tabs 86c extend upwardly beyond end wall 86a to provide orientation features for a printed circuit board 88a, to be discussed. It will be understood that the particular number of tabs provided is a matter of choice. A plurality of cantilever springs 86d are formed in side wall 86b and extend outwardly. Four springs are used in the described embodiment but again, the number of springs employed is a matter of choice. The cantilever springs are used to maintain concentricity between the first body 84 and the inside diameter of the tubular side wall of second body 94 during assembly and to hold the first body in place prior to welding bodies 84 and 94 together, to be discussed. A concave surface area 86e may be formed in end wall 86a and side wall 86b that interfits with a corresponding notch in first body 84 and serves as an alignment feature for the support ring relative to the first body. End wall 86a is also formed with cut-out openings 86f for alignment with strain gauges on sense surface 84a of the type discussed above, for example, in relation to the FIG. 6 sensor. An opening 86g may also be formed in end wall 86a at a location corresponding to the position of an ASIC mounted on printed circuit board 88a of the electronic module assembly 88, discussed below.

The end wall 86a can be formed with upwardly extending areas or convex features to control spacing of the printed circuit board, to be discussed, and the support ring, if desired.

Support ring 86 is received on first body 84 with the distal free end 86h supported on radially extending annular seat 84d and is permanently attached thereto, preferably by laser welding at selected locations around the periphery, such as four spaced apart locations. The number of welds employed is a matter of choice and, if desired, could be a continuous weld around the periphery. Side wall 86b, as well as end wall 86a, are spaced from the first body sufficiently to provide a control gap to ensure that the only contact between support ring 86 and first body 84 is at the distal free end 86h of the support ring side wall 86b, well removed from the location of the strain gauges on sense surface 84a.

Electronic module assembly 88 comprises a double sided copper and nickel plated printed circuit board 88a on which are disposed signal conditioning ASIC 88b, various related passive components, including, but not limited to capacitors and resistors, spring contact pads 88c and gauge contact pads 88d. Printed circuit board 88 is configured to correspond to end wall 86a of the support ring and is received thereon. The board is provided with tab 86c receiving recesses 88e spaced along the outer periphery of the board and notch 88f to provide alignment with the support ring. Openings 88g are formed through the printed circuit and are aligned with and generally match openings 86g of the support ring when the electronic module assembly is received on end wall 86a, see FIG. 10c.

The electronic module assembly needs to be rigidly attached to the sense element, i.e., the first body, to ensure a robust electrical connection between the assembly and the silicon gauges, however, stress applied to the sense surface due to the attachment needs to be minimized for reliable, long lasting and accurate performance. Mounting of the support ring on first body 84 so that attachment forces caused by mounting the electronic module assembly on end wall 86a are isolated from the sense surface in accordance with the invention has the result that the particular means used for attaching the assembly to the end wall is not critical. Thus, the printed circuit board 88a is mechanically and electrically connected to support ring 86 by suitable means such as by using silver epoxy or by laser welding a nickel plated copper ground trace (not shown) on the reverse side of board 88a. If desired, small depressions may be formed in end wall 86a to improve adhesion to the printed circuit board when silver epoxy, for example, is used. The grounding path of the metal components of the sensor includes the ground trace, support ring 86, the weld connection between the support ring and first body 84 and between bodies 84 and 94 and a weld connection 98b with a pin of connector/shroud 98 (FIG. 10d).

The wire bonds between the strain gauges, such as R1–R4 of FIG. 6c, and circuit pads 88d, the only direct connection between the sense surface and the electronic module assembly, are covered with a suitable gel encapsulant 88k. Gel encapsulant also covers the terminal pins of ASIC 88b.

Second body 94, as in the FIGS. 6 and 7 sensors, is provided with a second threaded post 94b and tubular side wall 94c formed with an opening 94d for dove-tail receipt of connector 98 and environmental seal 96. Distal end 94a of the tubular side wall is received on annular seat 84c of first body 84 and welded thereto as described in the previous embodiments with the longitudinal axis 94h essentially coinciding with axis 84h forming a common axis.

Springs 90 are held in spring holder 92 which is suitably attached to connector 98, as by interference snap pins 92a (FIG. 10) or ultrasonic weld joints. The springs make electrical contact, providing a suitable contact force, between spring contact pads 88c on printed circuit board 88a and connector pins, such as pin 98a shown in FIG. 10d.

Other means for attaching a circuit board to the sense surface using snap spring attachments or o-rings or other means subject to movement over time will adversely affect the calibrated output of the sensor. The welded support ring spaced from the sense surface made in accordance with the preferred embodiment of the invention, however, obviates this problem.

Although a force sensor is shown and described as the particular sensor in the embodiment described, it is within the purview of the invention to use other types of sensors having a stress sensitive sense surface with the support ring of the FIGS. 10, 10a–10d embodiment, for example, a pressure sensor such as that shown and described in U.S. Pat. No. 6,453,747, referenced above.

It should be understood that although particular embodiments of this invention have been described by way of illustrating the invention, other embodiments are also possible. The invention includes all modifications and equivalents of the disclosed embodiments falling within the scope of the appended claims.

What is claimed:

1. A sense element for use in a sensor comprising:
   a metallic body having a longitudinal axis and a portion formed with a generally planar sense surface lying in a plane generally perpendicular to the longitudinal axis, the body formed with a radially extending surface spaced from the sense surface,
   a plurality of strain gauges disposed on the sense surface,
   a metallic support member having an end wall formed with an opening through the end wall and having a depending side wall formed with a distal free end, the support member received over the planar surface with the distal free end permanently attached to the radially extending surface of said metallic body and with the opening in the end wall aligned with the strain gauges,
   a circuit board having circuit traces thereon disposed on the end wall on a surface thereof facing away from the sense surface, the strain gauges electrically connected to the circuit traces on the circuit board.

2. A sense element according to claim 1 in which the end wall of the support member is spaced from the sense surface.

3. A sense element according to claim 2 in which the side wall of the sense element is spaced from the metallic body except for the distal free end thereof.

4. A sense element according to claim 2 in which the radially extending surface is offset from the sense surface along the longitudinal axis forming a longitudinally extending portion between the sense surface and the radially extending surface and the side wall is spaced from the longitudinally extended portion of the body.

5. A sense element according to claim 1 in which the sense element is generally cylindrical.

6. A sense element according to claim 5 in which the sense surface and the end wall of the support member are generally circular in configuration.

7. A sense element according to claim 6 in which the side wall of the support member generally forms a continuous cylindrical configuration.

8. A sense element according to claim 1 in which the free distal end of the side wall is laser welded to the sense body.

9. A sense element according to claim 7 in which the free distal end of the side wall is laser welded to the sense body.

10. A sense element according to claim 9 in which the free distal end of the side wall is laser welded to the sense body at a plurality of spaced locations around the periphery thereof.

11. A sense element according to claim 1 in which the body is formed with a post extending along the longitudinal axis.

12. A sense element according to claim 11 in which the body is formed with another radially extending surface and further comprising a second body formed with a tubular side wall having a free distal end welded to the said another radially extending surface, the second body being formed with a post extending along the longitudinal axis.

13. A sense element according to claim 1 in which the circuit board is formed with an electrically conductive ground on a face side engaging the free end wall of the support member and is welded thereto to provide a mechanical and electrical connection therewith.

14. A sense element for use in a sensor comprising:
   a first generally cylindrical body having a first longitudinal axis and a portion formed with a circular generally planar sense surface lying in a plane generally perpendicular to the first longitudinal axis, the body having an outer periphery circumscribing the sense surface, a first post extending outwardly from the body along the first longitudinal axis,
   a plurality of strain gauges disposed on the sense surface,
   a second body having a sidewall forming a recess and being attached to the outer periphery of the first body, the second body having a second longitudinal axis generally common with the first longitudinal axis when the first and second bodies are attached to one another, a second post extending outwardly from the second body along the second longitudinal axis,
   a cup-shaped support member, the support member having an end wall and a ring shaped side wall, the ring shaped side wall having a distal end portion, the support member received on the outer periphery of the first body with the distal end portion attached to the outer periphery,
   a circuit board having circuit traces thereon disposed on the end wall on a surface thereof facing away from the sense surface and an opening formed in the end wall and the circuit board in alignment with the strain gauges with the strain gauges electrically connected to the circuit traces on the circuit board.

15. A sense element according to claim 14 in which the end wall of the support member is spaced from the sense surface.

* * * * *